US009183346B2

(12) United States Patent
Mihara

(10) Patent No.: US 9,183,346 B2
(45) Date of Patent: Nov. 10, 2015

(54) ROBOTIC APPENDAGES

(75) Inventor: Masaaki Mihara, Chiba (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 246 days.

(21) Appl. No.: 13/702,934

(22) PCT Filed: Mar. 12, 2012

(86) PCT No.: PCT/US2012/028806
§ 371 (c)(1),
(2), (4) Date: Dec. 7, 2012

(87) PCT Pub. No.: WO2013/137856
PCT Pub. Date: Sep. 19, 2013

(65) Prior Publication Data
US 2013/0238123 A1    Sep. 12, 2013

(51) Int. Cl.
*B25J 9/18* (2006.01)
*G06F 19/00* (2011.01)
*B25J 9/10* (2006.01)
*B62D 57/032* (2006.01)

(52) U.S. Cl.
CPC .............. *G06F 19/00* (2013.01); *B25J 9/102* (2013.01); *B62D 57/032* (2013.01)

(58) Field of Classification Search
CPC ............ B25J 9/1689; B25J 5/00; G06F 3/016
USPC ........................................ 318/568.11, 568.12
See application file for complete search history.

(56) References Cited

U.S. PATENT DOCUMENTS

| 5,158,493    | A  | * | 10/1992 | Morgrey        | 446/355    |
|--------------|----|---|---------|----------------|------------|
| 5,421,426    | A  |   | 6/1995  | De Beaucourt et al. | |
| 6,831,437    | B2 | * | 12/2004 | Filo           | 318/568.12 |
| 7,061,200    | B2 | * | 6/2006  | Iribe          | 318/568.16 |
| 7,348,747    | B1 | * | 3/2008  | Theobold et al.| 318/568.21 |
| 8,482,242    | B2 | * | 7/2013  | Nakasugi       | 318/689    |
| 2007/0132420 | A1 |   | 6/2007  | Lim et al.     |            |
| 2008/0009971 | A1 |   | 1/2008  | Kim et al.     |            |
| 2008/0150465 | A1 | * | 6/2008  | Baba et al.    | 318/568.12 |
| 2009/0237025 | A1 |   | 9/2009  | Takenaka et al.|            |
| 2010/0141197 | A1 | * | 6/2010  | Moon et al.    | 318/566    |
| 2011/0056321 | A1 | * | 3/2011  | Sim et al.     | 74/490.04  |
| 2011/0172824 | A1 |   | 7/2011  | Park et al.    |            |
| 2011/0178637 | A1 |   | 7/2011  | Lee et al.     |            |

FOREIGN PATENT DOCUMENTS

JP    2011/024983    2/2011

OTHER PUBLICATIONS

International Search Report and Written Opinion received in International Application PCT/US2012/028806, mailed on Jul. 12, 2012, filed on Mar. 12, 2012.
Yoneda et al., "Construction of a Quadruped with Reduced Degrees of Freedom," IEEE, 2000, pp. 28-33.

* cited by examiner

*Primary Examiner* — Rina Duda
(74) *Attorney, Agent, or Firm* — Knobbe Martens Olson & Bear LLP

(57) ABSTRACT

Embodiments provided herein generally relate to robotic limbs and uses thereof. In some embodiments, a motor for driving movement of the limb is provided. In some embodiments, the motor for driving movement of the limb can itself be repositioned, thereby altering the forces and/or torque involved in moving and/or operating the limb.

13 Claims, 9 Drawing Sheets

ROBOTIC APPENDAGES

CROSS-REFERENCE TO RELATED APPLICATION

This application is the U.S. National Phase entry under 35 U.S.C. §371 of International Application PCT/US2012/028806, filed Mar. 12, 2012, entitled "ROBOTIC APPENDAGES," the entirety of which is incorporated herein by reference.

TECHNICAL FIELD

Embodiments presented herein generally relate to robotic appendages and the movement thereof.

BACKGROUND

Robots and robotic appendages are mechanical devices capable of performing tasks automatically or in response to instructions. For example, electro-mechanical robot appendages can operate in response to computer-readable instructions.

SUMMARY

In some embodiments, a robotic limb is provided. In some embodiments, one or more of the limbs of the robot can adopt a generally elongate shape having a selected cross-section. In some embodiments, a robotic limb can be formed in a multiple number of segments joined at joints. In some embodiments, the limb segments can be moved independently of one another by motors about their respective joints. In some embodiments, a motor can engage with a drive shaft in order to drive a pivot mechanism located in or about a joint of its respective leg segment. In some embodiments, each of the motor and the drive shaft can be independently and reversibly constrained in place with respect to the other. In some embodiments, when the drive shaft is unconstrained and the motor is constrained, the motor can drive the pivoting mechanism when actuated. Conversely, when the drive shaft is constrained and the motor is unconstrained, the motor can move freely along the length of the drive shaft, enabling the motor to change its position along the length of its leg segment. In some embodiments, a weight measuring device can be further provided in a robotic limb for measurement of a weight acting on the limb. In some embodiments, the position of the motor along the length of the robotic limb can be based, at least in part, upon the measured weight.

In some embodiments, a method for moving a robotic leg is provided. In some embodiments, this includes providing a robotic leg and providing a first motor operationally coupled to the robotic leg. In some embodiments, the first motor is positioned at a first position on the robotic leg. In some embodiments, the method further includes using the first motor to move a lower leg section of the robotic leg from a first location to a second location and repositioning the first motor, relative to the robotic leg, to a second position.

In some embodiments, a method for moving a robotic leg is provided. In some embodiments, the method includes providing a hollow, elongate leg member having a first end and a second end. In some embodiments, the first end of the leg member is rotatably mounted to a portion of a robot by a pivot mechanism and the second end of the leg member is configured to engage a surface of an object. In some embodiments, the method further includes providing a motor within the leg member that is configured to reversibly mechanically engage with the pivot mechanism. In some embodiments, actuation of the motor when the motor is engaged with the pivot mechanism urges the leg member to rotate about the first end of the leg member and actuation of the motor when the motor is disengaged with the pivot mechanism urges the motor to move along the length of the leg member. In some embodiments, the method further includes engaging the motor with the pivot mechanism. In some embodiments, the motor is located at a first motor position along the length of the leg member. In some embodiments, the method further includes actuating the motor such that the leg member rotates to a first angle with respect to vertical about the first end of the leg member, disengaging the motor from the pivot mechanism, and actuating the motor such that the motor is moved to a second motor position along the length of the leg member.

In some embodiments, a motor system is provided. In some embodiments, the system includes a leg segment having a first end and a second end, a drive shaft extending between the first end and the second end of the leg segment, and a drive motor. In some embodiments, a rotor of the drive shaft is configured to engage a portion of the drive shaft. In some embodiments, the drive motor is configured such that rotation of the rotor when the drive motor is substantially fixed in place causes rotation of the drive shaft. In some embodiments, rotation of the rotor when the drive shaft is substantially fixed in place causes the drive motor to move along the length of the drive shaft.

In some embodiments, a robot limb is provided. In some embodiments, it includes the motor system of any one of the embodiments provided herein and a gear mounted to the tube adjacent to a first end of the tube. In some embodiments, the gear engages the first end of the drive shaft such that rotation of the drive shaft urges the gear to rotate. In some embodiments, the gear is configured to pivot the tube around an axis of rotation of the gear when the gear moves.

In some embodiments, a method for moving an object is provided. In some embodiments, the method includes providing a generally elongate object, the object including a cavity extending along at least a portion of a length of the object and positioning an actuator within the cavity. In some embodiments, the actuator is configured to reversibly operate in a first configuration and a second configuration, actuation of the actuator in the first configuration causes the object to pivot, and actuation of the actuator in the second configuration causes the actuator to move along the length of the object. In some embodiments the method further includes, operating the actuator in the first configuration so as to rotate the object to a first angle with respect to vertical. In some embodiments, the actuator is located at a first position along the length of the object. In some embodiments, the method further includes measuring a force exerted on at least a part of the object and operating the actuator in the second configuration so as to move the actuator to a second position along the length of the object. In some embodiments, the second position of the actuator is based at least in part upon the measured force.

DETAILED DESCRIPTION

Figure 1:
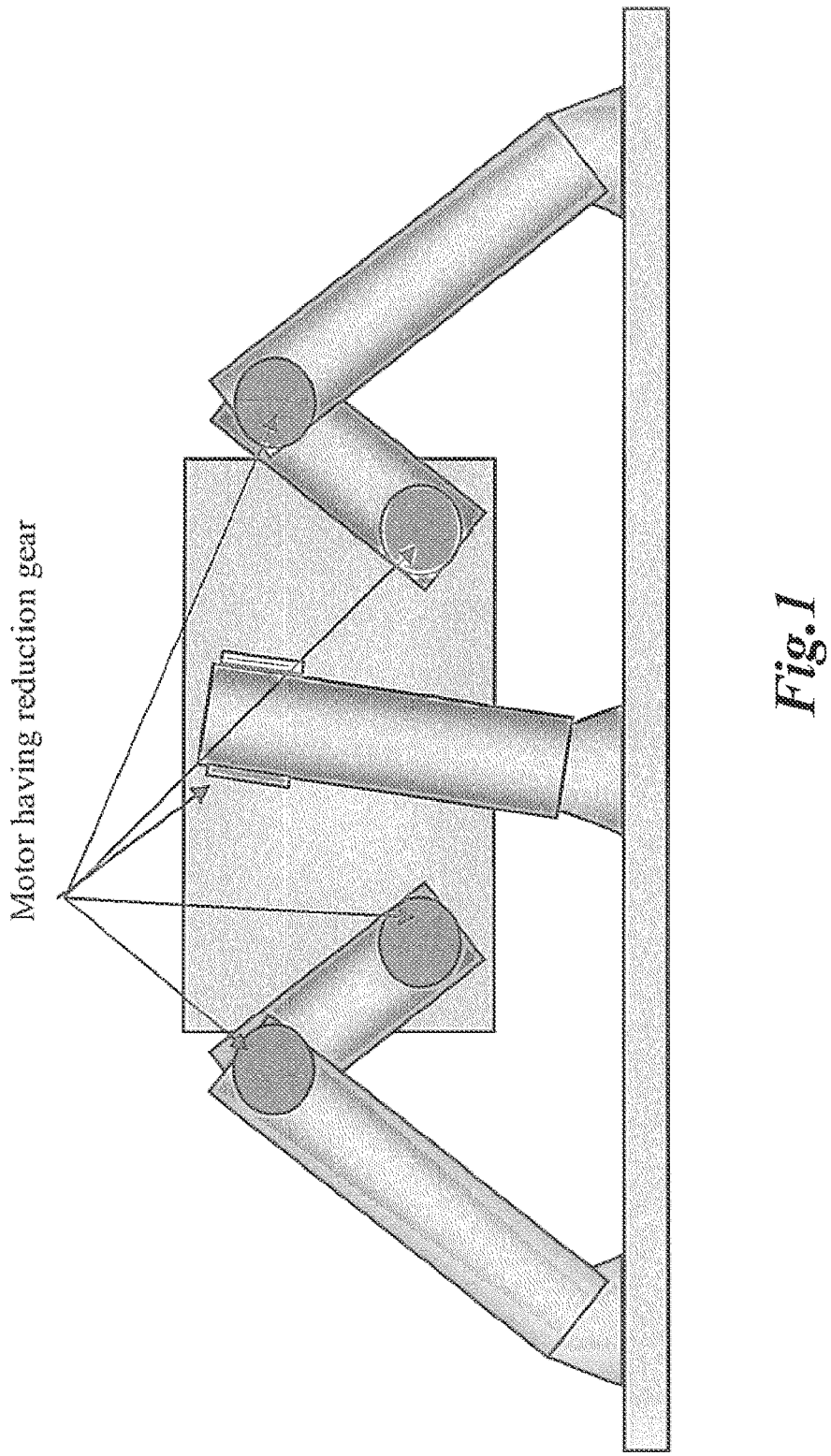
FIG. 1 is a schematic illustration of some embodiments of a multi-legged robot.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 2:
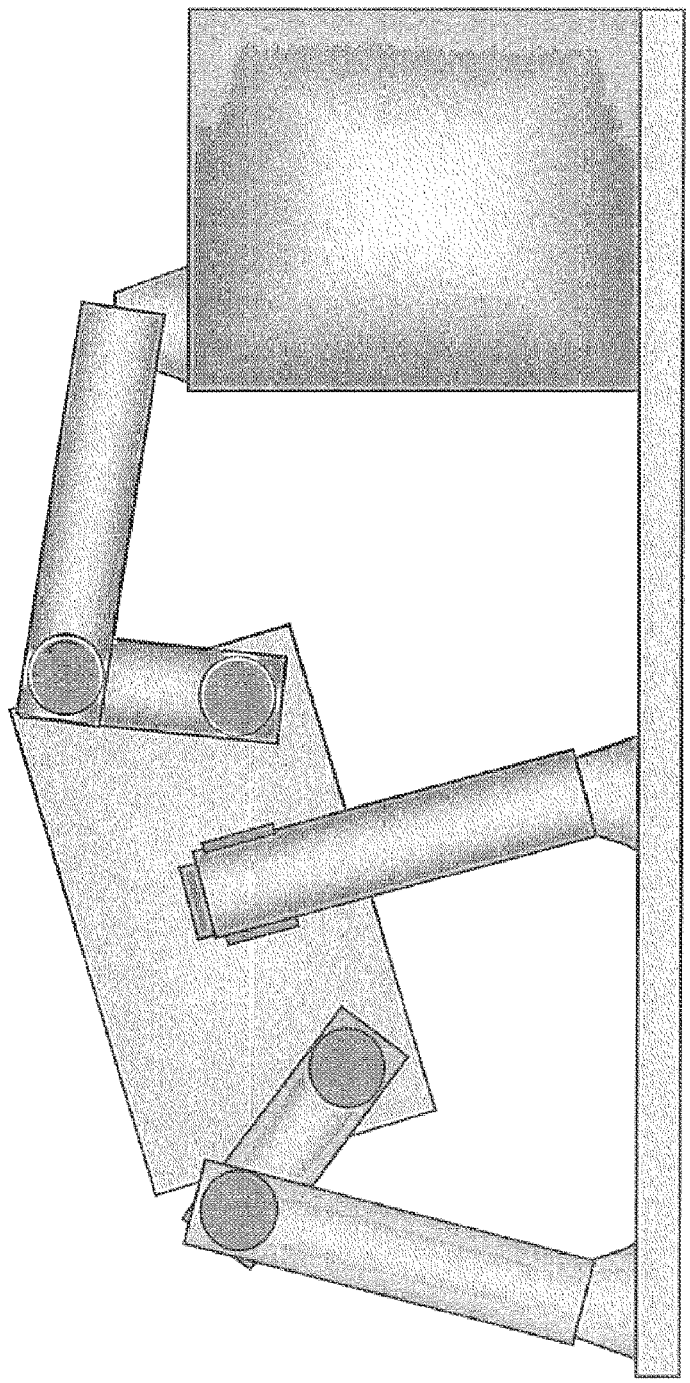
FIG. 2 is a schematic illustration of some embodiments of the multi-legged robot of FIG. 1 stepping on an object.

A walking robot can include multiple legs having feet that are employed to move the robot. In order to move the legs, motors having reduction gears may be provided in joints, as illustrated in FIG. 1. When in motion, a walking robot can encounter an object in its intended path that is of sufficient height that the robot cannot walk over the object. Instead, the robot must climb over the object to continue on its intended path. To climb over the object, one or more feet of the robot can step on the object, as illustrated in FIG. 2. Using a foot as a fulcrum, the motor in the leg(s) stepping on the object can generate a torque sufficient to rotate the robot about the foot and lift the robot body to the height of the object, where it can continue along its intended path. However, to accomplish this action, the torque generated by the motor must correspond to the weight being pivoted. In some situations, an excessive load can act on the motor, causing the motor to fail. Such motor failure can both inhibit the robot from climbing over the object, as well as its ability to walk.

Provided herein are robotic appendages that can reduce and/or change the load or stress acting on joints of the appendage. In some embodiments, this can also (or alternatively) promote the stability of the robot through changes in the center of gravity of the robot. While the robotic limbs of the present disclosure are discussed in the context of robotic legs, it is understood that the limbs can include any moveable member of the robot, including, but not limited to, legs, arms, treads, and the like. Furthermore, it is understood that the robotic appendages provided herein can be used separately from a robot specific application, for example, in other arm and/or appendage type applications (such as in artificial limbs, excavating equipment, or other devices where torque and/or force can be influenced by the distribution of mass along an arm to be moved).

Furthermore, while the present disclosure provides detailed embodiments regarding the use of the appendage as a "leg", the appendage is not limited to such applications, and can be used in any moveable application in which two segments pivot about a common point. However, for the sake of brevity and for the demonstration of several specific embodiments, the following section details how some embodiments of the robotic appendage can be employed in a walking robot.

Walking robots have at least one or more moveable legs. The legs of the robot can be provided in a generally elongate shape having a selected cross-section. While not required, a leg can be formed from a multiple number of segments joined at joints. In some embodiments, the leg segments can be moved independently of one another by motors about their respective joints.

As discussed in detail below, in some embodiments, the leg (i.e., robotic appendage) can include one or more motors positioned in a cavity of a leg segment. In some embodiments, a motor can engage with a drive shaft in order to drive a pivot mechanism (e.g., a gear) located in or about a joint of its respective leg segment. In some embodiments, each of the motor and the drive shaft can be independently and reversibly constrained in place with respect to each other. In some embodiments, when the drive shaft is unconstrained and the motor is constrained, the motor can drive the pivoting mechanism when actuated. Conversely, in some embodiments, when the drive shaft is constrained and the motor is unconstrained, the motor can move freely along the length of the drive shaft, enabling the motor to change its position along the length of its leg segment. In some embodiments, when the drive shaft is constrained and the motor is unconstrained, the position of the motor can be changed using another motor.

In some embodiments, movement of the motor position within a leg segment can be beneficial to the operation of the robot. For example, the change of motor position can improve stability of the robot or other device associated with the leg (or, more generally, the appendage). In general, as the center of gravity of an object is raised, the object becomes more unstable and, conversely, as the center of gravity of the object is lowered, the object becomes more stable. Thus, movement of the motor from a starting position to a finishing position, where the finishing position is relatively lower than the starting position, the center of gravity of the robot can be lowered, improving the stability of the robot.

For example, assume a robot having a multiple number of legs attached to the robot body, each configured as discussed above. When a leg is not in motion, for stability, it can be desirable to position the motor of the leg at a position close to the floor so as to enhance the stability of the robot overall.

During motion of a leg segment, however, it can be beneficial to place the motor of the leg segment in a different position. In general, in order to move an object rotationally about a fulcrum to which it is attached, a torque (i.e., a force acting at a distance) may be applied to the fulcrum which exceeds the torque acting at the fulcrum in opposition to the desired rotational motion. In the context of a robot leg (or other appendage), the motor applies the torque that enables the leg segment to pivot about the joint.

Notably, the torque opposing that applied by the motor includes a component due to the weight of the motor itself. The magnitude of this torque is related to the weight of the motor and the distance of the motor from the joint about which the leg (or other appendage) segment is to pivot. Thus, by moving the motor to a position that is relatively close to the joint about which the leg pivots, the stress (e.g., torque) on the joint is reduced. Furthermore, since the torque opposing the desired rotation motion of the leg segment is reduced, the torque to be applied by the motor for producing a desired rotational motion is also reduced.

For example, continuing the example above, assume that the leg segment is at rest and the motor is positioned adjacent to the end of the leg closest to the floor. As discussed above, positioning the motor within the leg segment in this manner improves the stability of the robot, relative to other positions of the motor within the leg segment. Further, assume that a pivoting motion of the leg segment is to be performed. In some embodiments, the motor can be moved from its current, or first, position to a second position closer to the joint about which the leg segment is to pivot. The motor can be further configured with a braking system to inhibit motion of the motor along the drive shaft while the leg segment undergoes a pivoting motion. So positioned, the distance between the joint and the motor in its final position is reduced, as compared to its starting position. Thus, the amount of torque to be supplied by the motor for pivot of the leg segment is reduced when the motor is in the final position, as compared to a pivoting motion with the motor in its starting position. Beneficially, during the life of the motor, this reduction in the output torque required for pivoting motions of the leg segment can lessen the likelihood of mechanical breakdown of the motor and extend its lifetime.

In some embodiments, the motor and the drive shaft can adopt different configurations, depending upon a desired output due to activation of the motor. First and second configurations of the motor and drive shaft can be reversibly adopted by changing which of these two components remains in a stationary position with respect to the appendage segment during actuation of the motor.

In some embodiments, in the first configuration, the drive shaft can be free to rotate, while the motor can be fixed in place. In some embodiments, activation of the motor in this configuration can cause a rotor of the motor to rotate, the motor remains stationary. Rotation of the rotor can also urge the drive shaft to rotate, causing a pivoting mechanism in the joint (e.g., a multiple number of gears) to rotate the leg segment.

In some embodiments, in the second configuration, the drive shaft can be inhibited from rotation, while the motor can be free to rotate. In some embodiments, activation of the motor in this configuration can again cause the rotor of the motor to rotate. However, as the drive shaft is inhibited from rotation, the motor can both translate and rotate with respect to the leg segment (e.g., a helical motion).

In some embodiments, the leg segment (or other appendage) can further include a multiple number of sensors and markers. In some embodiments, a first multiple number of sensors can be positioned on the motor and the markers can be positioned along a length of the leg segment (e.g. on, in, or adjacent to the guide shafts). In some embodiments, the markers can each uniquely identify a position along the length of a leg. So configured, the first multiple number of sensors can employ the markers in order to identify a position of the motor along the leg. The position of the motor can be further adjusted based upon the position of the motor identified by the sensors.

In some embodiments, a second multiple number of sensors can be provided in order to measure the weight exerted on the leg. In some embodiments, this weight information can be used alone or in combination with weight measurements from other legs to determine a desired position of the motor within respective legs (or appendages). For example, a motor can be positioned at a location which provides for a desired weight distribution over the legs (e.g., a substantially equal weight distribution).

For example, continuing the example above, assume that the leg segment steps on an object. As the leg steps on the object, in order to reduce the torque applied by the motor, the robot can instruct the motor to move to a position near the joint. After the leg steps on the object, the robot can instruct the motor to move to a relatively lower position (e.g., closer to the end of the leg segment) in order to lower the center of gravity of the robot and increase its stability.

Reference will now be made to FIG. 3, which illustrates some embodiments of an appendage (in this case a leg), which can optionally be part of a multi-legged robot 300 that includes a moveable motor. The robot 300 can include a body 302 (indicated in dashed outline) and a multiple number of legs (of which only one is shown). As noted above, it is understood that, while the moveable motor is discussed in the context of a multi-legged moveable robot, additional embodiments of the moveable motor can also be employed with other configurations of moveable robots, other types of robots (e.g., robots with arms, etc.), other devices and/or applications that include moveable appendages, without limit.

Figure 3A:
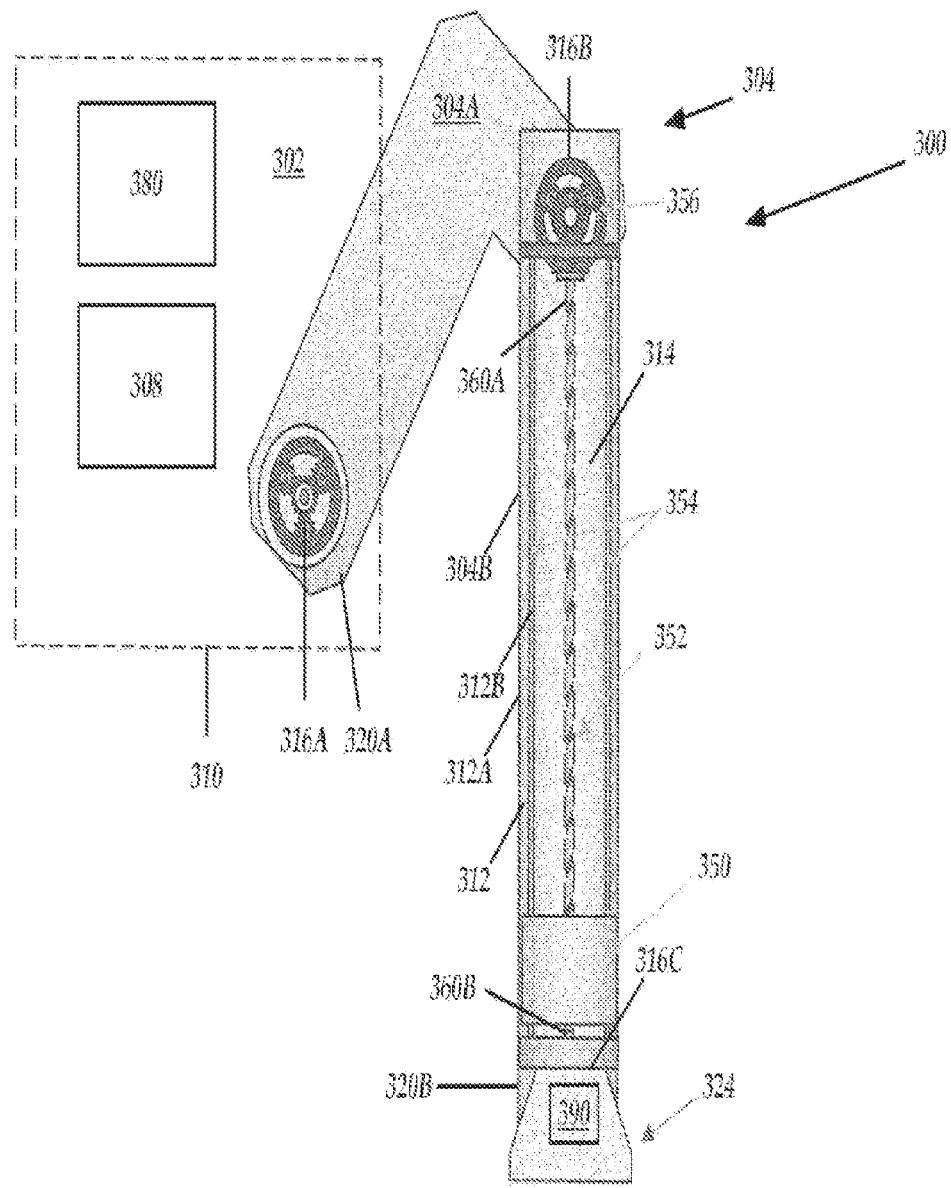
FIG. 3A is a schematic illustration of some embodiments of a robotic appendage. The appendage is depicted prior to positioning the appendage on an object having a height greater than a surface on which some remaining section of a robot stands. In some embodiments, a moveable motor that actuates one or more joints of the appendage is contained within the appendage and is positioned adjacent to the base of the appendage.

With further reference to FIG. 3A, a leg 304 of the robot 300 is further shown. The leg 304 can include a casing 312 formed from a generally elongate, hollow member having an outer surface 312A and an inner surface 312B that contains a leg cavity 314. For example, in the embodiment of FIG. 3A, the leg 304 is illustrated in a generally tubular configuration having a circular cross-section. It can be understood, however, that this configuration is provided as an example and that the geometric configuration of the leg 304 can vary as desired. For example, geometric parameters, including but not limited to, cross-sectional area (A), length (L), width (W), wall thickness between the outer and inner surfaces 312A, 312B, and the like, can be varied within the leg 304 as necessary. While the leg 304 is depicted with the casing 312, in some embodiments, the casing 312 is optional. In some embodiments, instead of a casing 312, a support frame can be used. In some embodiments, the moveable motor and components can be placed on the outer surface of the appendage, rather than on the inside.

The leg 304 can be formed from any desired material. Examples of such materials can include, but are not limited to, metals, polymers, ceramics, carbon nanotubes, or combinations thereof (e.g., composites such as carbon fiber-reinforced fiber composites, carbon-matrix composites, ceramic fiber-reinforced composites, carbon matrix composites, metal-fiber reinforced composites, metal-matrix composites, etc.). Examples of the metals may include ferrous alloys (e.g., cast irons, steels) and non-ferrous metals (e.g., aluminum, magnesium, titanium, and alloys thereof).

The materials that form the leg 304 can be selected on the basis of one or more of cost, formability, physical properties (e.g., weight, density, glass transition temperature, melting temperature, ductile to brittle transition temperature, coefficient of thermal expansion, etc.), chemical properties (e.g., inertness to selected chemical species), mechanical properties (e.g., strength, toughness, fatigue, thermal shock, etc.), etc.

In some embodiments, the leg 304 can include a multiple number of joints. In some embodiments, a first joint 316A can be positioned at about a first end 320A of the leg 304 (e.g., a hip joint). A second joint 316B (e.g., a knee joint) can be placed at a selected position along the length of the leg 304. A third joint 316C (e.g., an ankle joint) can be placed at a selected position at about a second end 320B of the leg 304. The joints can connect respective portions of the robot body 302 and the leg 304 to each other or respective portions of the leg 304 to itself. The joints can also include mechanical and/or electrical components enabling the leg 304 to receive instructions for motion.

Embodiments of the leg 304 can be further divided into a multiple number of leg segments joined by the joints. For example, as illustrated in FIG. 3A, a first, or upper, leg segment 304A can be positioned between the joints 316A and 316B and a second, or lower, leg segment 304B can be positioned between the joints 316B and 316C. While the three joints, 316A, 316B, and 316C, and two leg segments 304A and 304B are illustrated in the embodiment of FIG. 3A, it can be understood that embodiments of the robot 300 can include greater or fewer numbers of joints and leg segments, as necessary.

Figure 3B:
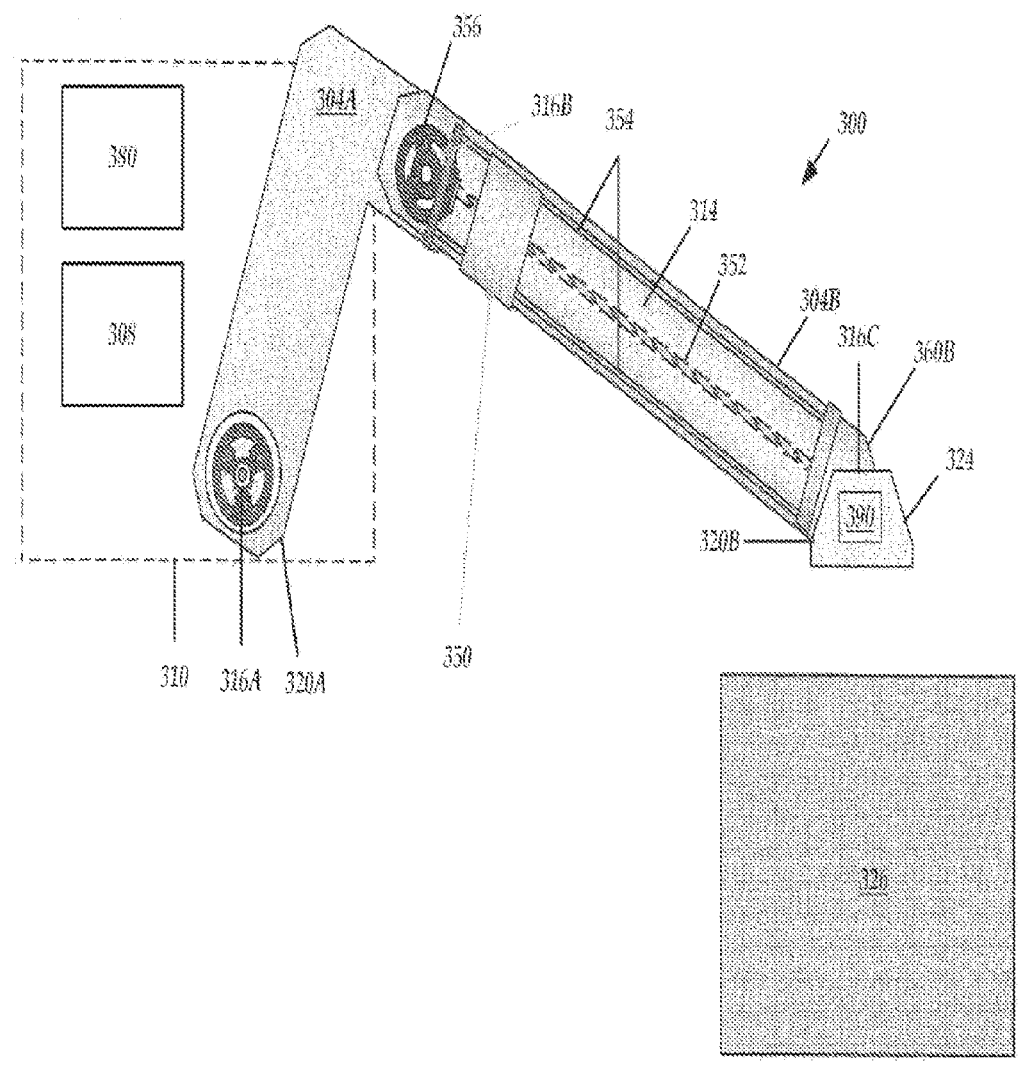
FIG. 3B is a schematic illustration of the appendage of the embodiments of FIG. 3A. The appendage is depicted prior to positioning the appendage on the object. The position of the motor is moved to a position closer to a joint, as compared to FIG. 3A.
Figure 3C:
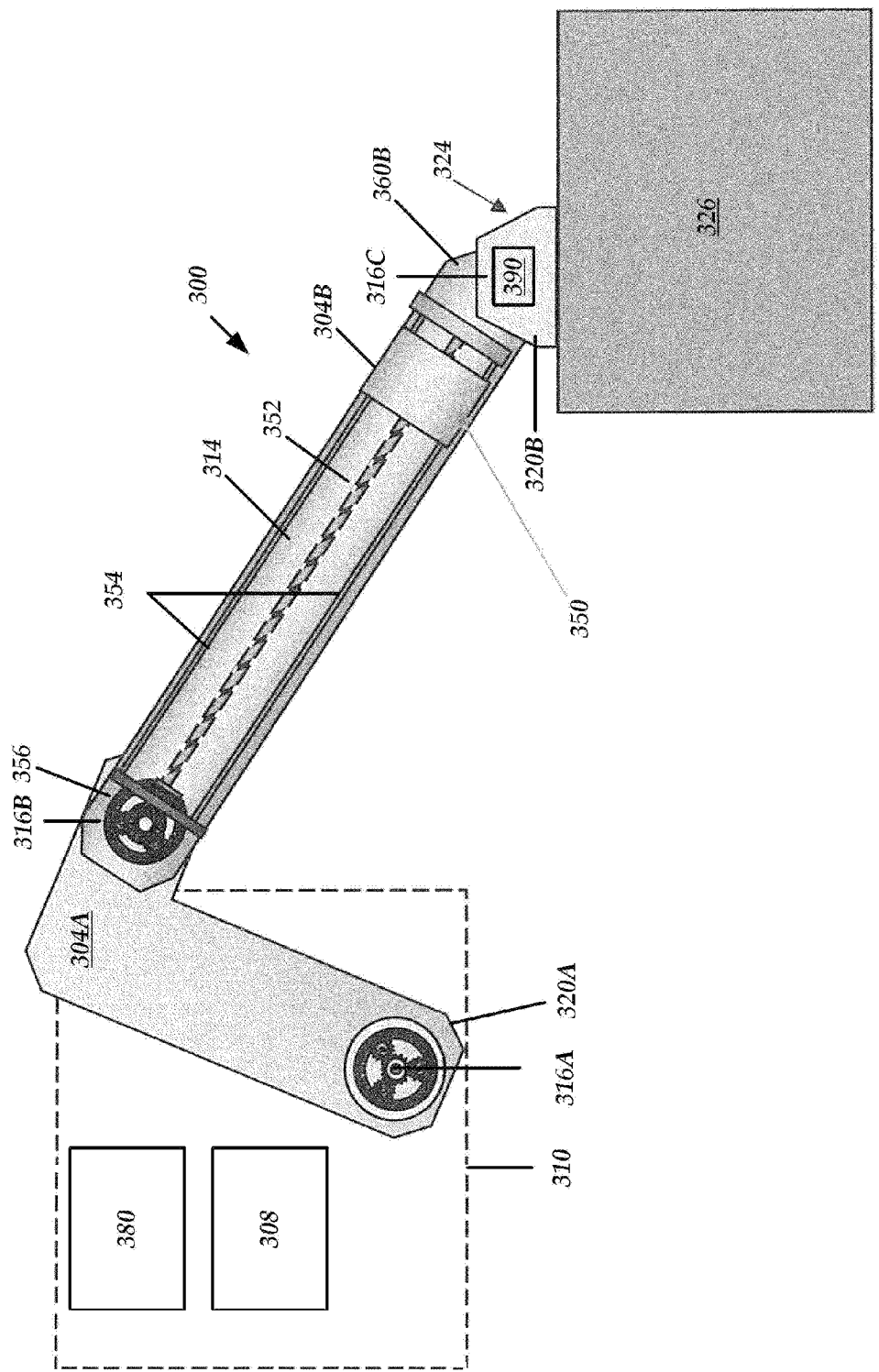
FIG. 3C is a schematic illustration of the appendage of FIGS. 3A and 3B. The appendage is depicted after positioning the lower part of the appendage on the object. The position of the motor contained within the appendage is moved towards the base of the appendage, as compared to FIG. 3B.

In some embodiments, the second end 320B of the leg 304 can further include a foot 324 that is configured to contact a surface of an object 326 (FIGS. 3B, 3C). The object 326 can include, but is not limited to, any surface upon which the leg 304 can be positioned for support of the weight of the robot 300. For example, the object 326 can be a surface upon which the robot 300 walks, a structure over which the robot 300 climbs, and the like.

In some embodiments, to facilitate engagement of the foot 324 with the object 326, the foot 324 can include an upper end that is mounted to the leg segment 304B of the leg 304 (a terminal leg segment when multiple leg segments are present in the leg). In some embodiments, the foot 324 can be mounted to the leg segment 304B at about the joint 316C. In some embodiments, the joint 316C can include a simple pivot that moves under the influence of gravity as the position of the leg segment 304B is changes. In some embodiments, the joint 316C can include a mechanically actuatable pivot mechanism, as discussed above with respect to joints 316A, 316B.

In some embodiments, the foot 324 can further include a lower end that is configured to engage the object 326. In certain embodiments, the lower end of the foot 324 can include a multiple number of mechanisms for enhancing a coefficient of friction between the foot 324 and the object 326 during contact. Examples of these mechanisms can include, but are not limited to, roughening the lower end of the foot 324 (e.g. corrugations, striations), adhesives, high friction materials (e.g., elastomers), and the like. In some embodiments, the lower end of the foot 324 can possess a cross-sectional area larger than that of the leg 304. This larger cross-sectional area can allow the lower end of the foot 324 to spread the weight supported by the leg over a larger area, substantially avoiding weight concentration at a particular location within the foot 324.

In some embodiments, the body 302 can include an exterior housing 310 which at least partially contains mechanical components 380 and electronic components 308. The mechanical components 380 can include, but are not limited to, any mechanical members necessary to support the desired operation of the robot 300. For example, the mechanical components 380 can include mounting structures for mechanical connection of the multiple number of legs 304 to the body 302 and mechanical members configured to move at least a portion of the legs 304 with respect to the body 302 (e.g., motors, gears, hydraulically actuated members, etc.).

In some embodiments, the electronic components 308 can include, but are not limited to, any electronic devices necessary to support the desired operation of the robot 300. For example, the electronic components 308 can include power sources, electrical circuits, memory devices, communication devices, connectors, transmission lines, and the like. In an illustrative embodiment, any of the operations, processes, etc. described herein can be implemented as computer-readable instructions stored on a computer-readable medium. The computer-readable instructions can be executed by a processor of a mobile unit, a network element, and/or any other computing device, whether located within the body 302 of the robot 300 or external to the robot 300.

The components of some embodiments of the second leg segment 304B will now be discussed in greater detail with respect to FIGS. 3A and 4. As illustrated in the embodiment of FIG. 3A, the second leg segment 304B can include a joint driving motor 350, a drive shaft 352, a multiple number of guide shafts 354, a pivot mechanism 356, bearings 358, and a multiple number of power components, each of which can be at least partially positioned within the leg cavity 314 (when the leg includes such a cavity). It can be understood that, while the disclosed embodiments can be discussed in the context of the second leg segment 304B, these embodiments can be applied to any limb or limb segment, both in the context of a robot and/or non-robot applications, without limit.

In some embodiments, the joint driving motor 350 (FIG. 4), and other components of the second leg segment 304B that consume electricity to operate, can receive electrical power from the power components. For example, the power components can include a power transmission line 368A and a power feeding slider 368B. In some embodiments, power can be provided to the second leg segment 304B through the transmission line 368A. In some embodiments, the power feeding slider 368B can be electrically connected to the transmission line 368A and can be configured to provide power to the joint driving motor 350, whether the joint driving motor 350 is stationary or in motion.

The pivot mechanism 356 can be positioned in or adjacent to a respective joint (e.g., joint 316B) and configured to rotate or pivot the second leg segment 304B with respect to the first leg segment 304A. In some embodiments, the pivot mechanism 356 can include a multiple number of gears.

In some embodiments, the drive shaft 352 can include a generally elongate, rod having a first end 360A and a second end 360B. In some embodiments, the drive shaft 352 can be positioned at about a center of the cross-section of the leg cavity 314 and enable mechanical communication between the joint driving motor 350 and the pivot mechanism 356. For example, the first end 360A of the drive shaft 352 can mechanically engage the pivot mechanism 356, while a portion of the drive shaft 352 between the first and second ends 360A, 360B can mechanically engage the joint driving motor 350. In some embodiments, the bearings 358 can be placed within the second leg segment 304B at selected locations, as necessary, to facilitate movement of the drive shaft 352, the joint driving motor 350, and the pivot mechanism 356, inter alia.

For example, in some embodiments, the drive shaft 352 can include a drive shaft guide 402. As discussed below, the drive shaft guide 402 can be positioned on the drive shaft 352 and allow engagement of the drive shaft 352 with the joint driving motor 350.

In some embodiments, a drive shaft brake 404 may be positioned adjacent to the drive shaft 352. The drive shaft brake 404 may include a disk 406 and a multiple number of drive shaft brake pads 410. In some embodiments, the disk 406 can be mounted on an end of the drive shaft 352 such that the disk 406 rotates with the drive shaft 352. In some embodiments, the multiple drive shaft brake pads 410 can be reversibly actuated between an engaged position and a disengaged position (e.g., by a solenoid). In some embodiments, in the engaged position, the drive shaft brake pads 410 can contact the disk 406 and substantially inhibit motion of the disk 406 and the drive shaft 352. In some embodiments, in the disengaged position, the drive shaft brake pads 410 can be substantially out of contact with the disk 406 and the drive shaft 352 can rotate freely. It may be understood that different brakes may be employed in alternative embodiments (e.g., other friction-type brakes, gear-type brakes with teeth that directly interlock the disk 406, etc.).

In some embodiments, the joint driving motor 350 can include a rotor 412, and a motor brake 414. In some embodiments, the drive shaft 352 can be mechanically connected to the joint driving motor 350 via the guide shaft 354 along its length via the rotor 412. For example, the rotor 412 can include a rotor guide 416 that is configured to mate with the drive shaft guide 402 on the drive shaft 352. In some embodiments, the rotor guide 416 and drive shaft guide 402 can be provided in a helical configuration. For example, the drive shaft guide 402 can be present on about the surface of the rotor 412 and extend in a helical configuration along at least a portion of the length of the drive shaft 352.

Figure 4:
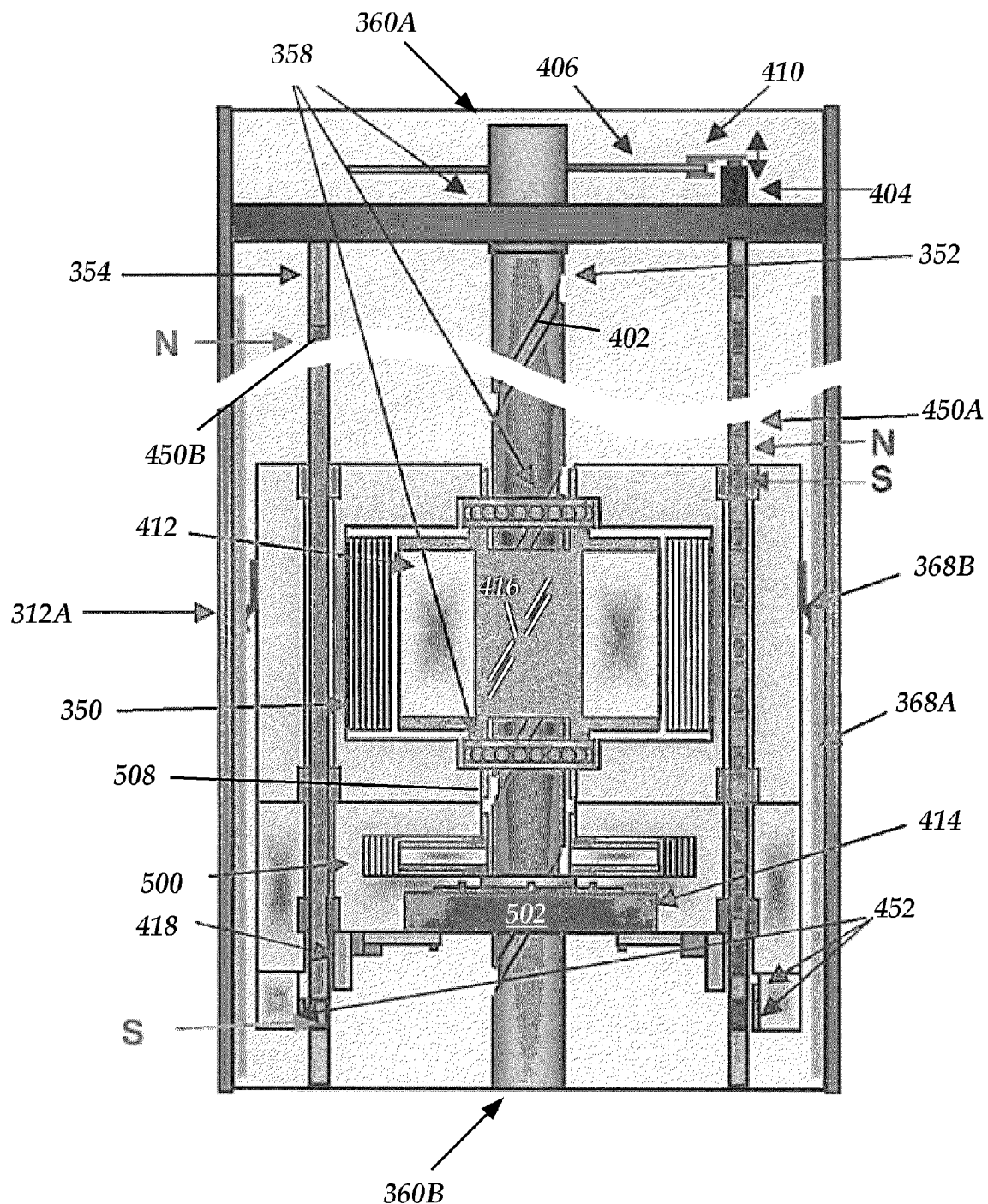
FIG. 4 is a schematic illustration of an internal structure of some embodiments of the motor.

As illustrated in the embodiment of FIG. 4, in some embodiments, the motor brake 414 can be mechanically connected to the joint driving motor 350 and can include a multiple number of motor brake pads 418. The motor brake 414 can be actuated between an engaged position and a disengaged position. When the motor brake 414 is placed in the engaged position, the motor brake pads 418 can extend outwards and contact the guide shafts 354 (e.g., frictional contact) to substantially constrain the joint driving motor 350 in place with respect to the drive shaft 352 when the motor brake 414 is engaged. Conversely, when the motor brake 414 is placed in the disengaged position, the motor brake pads 418 can be retracted from their engaged position and position of the joint driving motor 350 can be moved (e.g., translation along the path of the of the drive shaft guide 402).

As further discussed in greater detail below, in some embodiments, the position of the joint driving motor 350 along the length of the leg segment 304B is based, at least in part, upon the position of the leg segment 304B. For example, the position of the joint driving motor 350 can be changed from a first motor position to a second motor position movement when the leg segment 304B is moved from a first leg location to a second leg location.

In further embodiments, the joint driving motor position can be based, at least in part, upon either a current or future location of the leg segment 304B. For example, in the case where the joint driving motor position is based upon a current location of the leg segment 304B, the joint driving motor 350 can be repositioned after movement of the leg segment 304B. In some embodiments, in the case where the joint driving motor position is based upon a future location of the leg segment 304B, the joint driving motor 350 can be repositioned prior to movement of the leg segment 304B.

In another embodiment, movement of the leg segment 304B from the first leg location to the second leg location can be performed either a substantially single movement or in a multiple number of incremental movements. Correspondingly, repositioning of the joint driving motor 350 can be performed in a substantially single movement or in a multiple number of incremental movements. For example, for movement of the leg segment 304B from the first leg location to the second leg location in a single movement operation, the joint driving motor 350 can be repositioned from the first motor position to the second motor position in a single movement operation.

In some embodiments, the leg segment 304B may be moved from the first leg location to the second leg location in a multiple number of incremental movement operations. Accordingly, the joint driving motor 350 can also be repositioned from the first motor position to the second motor position in a multiple number of corresponding, incremental movement operations. For example, movement of the joint driving motor 350 may be performed between periodic stops in movement of the leg segment 304B between the first and second leg positions. It can be understood that the joint driving motor 350 can be repositioned either before or after movement of the leg segment 304B, as necessary, whether the respective movements are performed in a substantially single movement operation or a multiple number of incremental movement operations. In some embodiments, the joint driving motor 350 can be repositioned during the movement of the leg segment 304B.

In some embodiments, the joint driving motor 350 can include a multiple number of motors. In some embodiments, a first motor of the multiple number of motors can be employed to induce motion in one or more joints of the leg segment 304B and can reversibly constrained in place with respect to the drive shaft 352, as discussed above. In some embodiments, a second motor of the multiple number of motors can be employed to change the position of the first motor.

Figure 5:
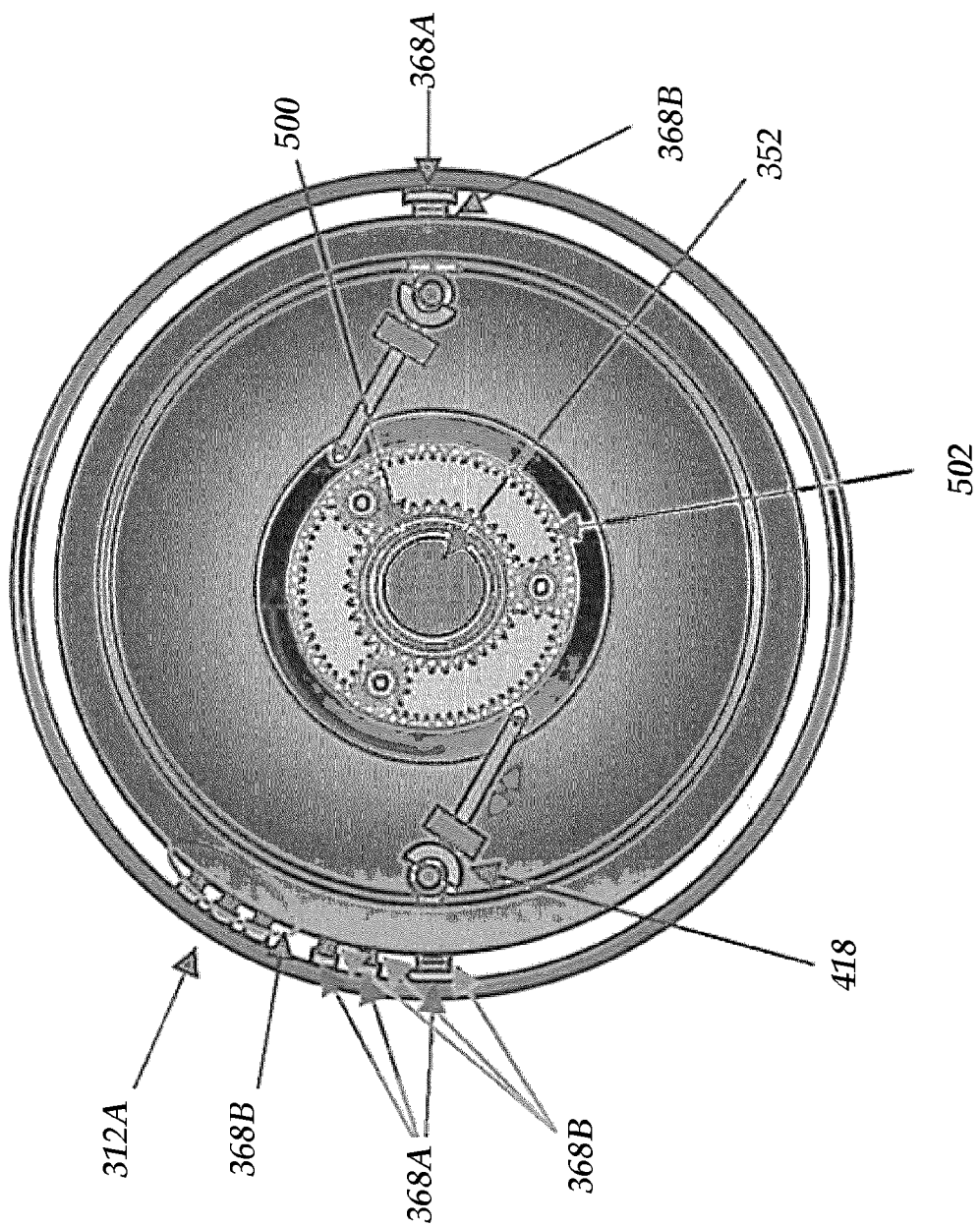
FIG. 5 is a schematic illustration of some embodiments of a motor brake for the motor.

Some embodiments of the components of the motor brake 414 are illustrated in greater detail with reference to FIG. 5. In some embodiments, the motor brake 414 can be mounted about the drive shaft 352 and mechanically attached to the joint driving motor 350. For example, a linking member 508 may connect the joint driving motor 350 and the motor brake 414. The motor brake 414 may include a fixing motor 500, a gear 502, and the multiple number of motor brake pads 418. In some embodiments, the fixing motor 500 can be positioned about the drive shaft 352 and the gear 502 can be mechanically connected to the fixing motor 500. The multiple number of motor brake pads 418 can be mechanically connected to the gear 502 (e.g., on or about the outer circumference). In some embodiments, the motor brake 414 can be further mechanically connected to the fixing motor 500 in order to inhibit movement of the joint driving motor 350 when the motor brake 414 is engaged.

Figure 6:
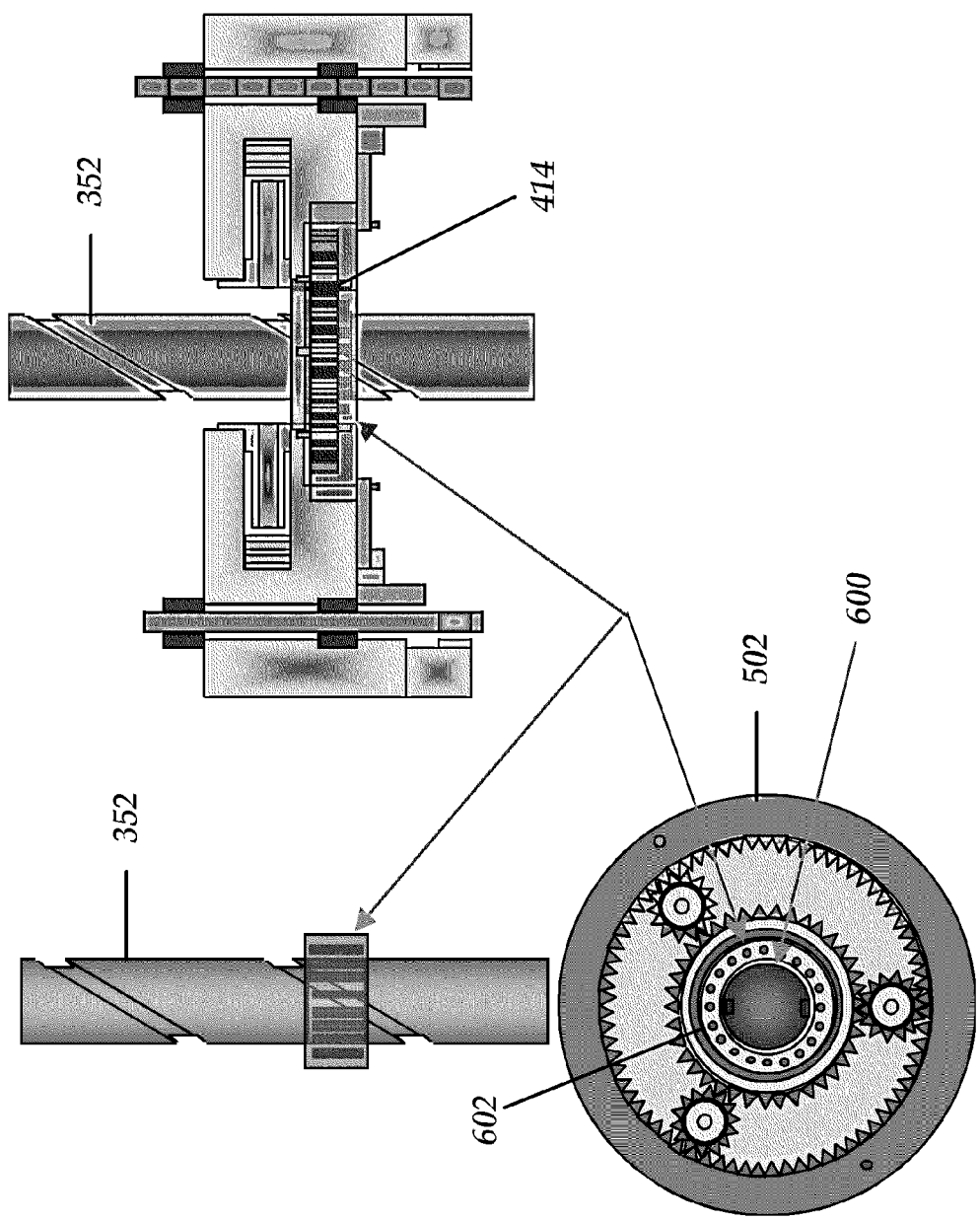
FIG. 6 is a schematic illustration of the motor brake of FIG. 5 in greater detail.

FIG. 6 illustrates the motor brake 414 in greater detail. For example, a gap 600 can be present between the gear 502 and the drive shaft 352 to allow free rotation of the drive shaft 352 when the motor brake 414 is disengaged. In an embodiment, the gap 600 may be empty. In another example, at least a portion of the gap 600 may be filled with bearings 602.

When the fixing motor 500 is actuated, the fixing motor 500 can control the position of the multiple number of motor brake pads 418, via the gear 502. In one embodiment, actuation of the fixing motor 500 in a first direction can cause the gear 502 to rotate such that the multiple number of motor brake pads 418 are urged outward, into contact with the guide shaft 354 (e.g., the engaged position of the motor brake 414). So positioned, the motor brake 414 can inhibit translational motion of the joint driving motor 350 along the length of the drive shaft 352 when actuated. In some embodiments, actuation of the fixing motor 500 in a second direction, opposite to the first direction, can cause the gear 502 to rotate in a direction opposite that which it traveled to adopt the engaged position. In some embodiments, the multiple number of motor brake pads 418 can be urged inward, out of contact with the guide shaft 354, adopting the disengaged position of the motor brake 414. So positioned, the motor brake 414 can substantially permit translational motion of the joint driving motor 350 along the length of the drive shaft 352 when actuated.

Some embodiments of positioning of the joint driving motor 350 within the second leg segment 304B will now be discussed with further reference to FIG. 4.

In some embodiments, a multiple number of markers 450 can be positioned adjacent to the joint driving motor 350. In some embodiments, the multiple number of markers 450 can be further configured for detection by a multiple number of sensors 452. In some embodiments, the sensors 452 can be positioned on the joint driving motor 350. In some embodiments, the markers 450 can be configured to be sensed or read by the sensors 452 and can further be configured to provide information uniquely identifying their respective position or position relative to a reference position. In some embodiments, the sensors 452 can determine the respective position of a marker based upon sensing or reading the marker. In some embodiments, the sensors 452 can transmit the information sensed or read from a respective marker to a computing element that determines or infers the marker position from the received information.

In some embodiments, the guide shafts 354 can be configured with markers 450 that can be detected by one or more sensors 452 mounted to the joint driving motor 350. In some embodiments, one of the guide shafts 354 can include a magnetic encoder pattern along its length (e.g., 450A). In some embodiments, another guide shaft 354 can be magnetized to function as end markers (e.g., 450B) that designate positions at which travel of the joint driving motor 350 along the length of the leg segment 304B is to end. In this example, the corresponding sensors 452 can be magnetic sensors mounted to the joint driving motor 350. In another embodiment, an optical linear encoder and magnetic linear encoder may be used separately.

In some embodiments, the position of the joint driving motor 350 can be controlled based upon one or more of the determined marker positions. For example, the joint driving motor 350 can be configured to receive control signals for controlling the motion and position of the joint driving motor 350 at a selected location along the leg segment 304B. In response to receiving a control signal, the joint driving motor 350 can move along the length of the leg segment 304B and the sensors 452 can sense or read the markers 450 adjacent to the joint driving motor 350. Once it is determined that the joint driving motor 350 has moved to the marker corresponding to the desired position along the length of the leg segment 304B, the movement of the joint driving motor 350 can be stopped.

In some embodiments, the joint driving motor 350 and the drive shaft 352 can adopt a first configuration in which the motor brake 414 is engaged and the drive shaft brake 404 is disengaged. So configured, the drive shaft 352 can rotate freely, while the joint driving motor 350 can be constrained in place. When the joint driving motor 350 is actuated in this configuration, the rotor guide 416 of the rotor 412 can engage with the drive shaft guide 402 can urge the drive shaft 352 to rotate.

In some embodiments, the joint driving motor 350 and the drive shaft 352 can further adopt a second configuration in which the motor brake 414 is in the disengaged position and the drive shaft brake 404 is engaged. So configured, the drive shaft 352 can be inhibited from rotation, even in response to activation of the joint driving motor 350, while the joint driving motor 350 can be free to rotate and translate along the helical path of the rotor guide 416. When the joint driving motor 350 is actuated in this configuration, the rotor 412 can urge the joint driving motor 350 to follow the helical path of the rotor guide 416.

Some embodiments of operation of the multi-legged robot 300 to climb the object 326 will now be discussed with reference to FIGS. 3A-3C. FIG. 3A illustrates the leg 304 in a rest, or non-moving state. The joint driving motor 350 can be placed in a starting position adjacent to the foot 324. The leg segment 304B can further adopt its first configuration, securing the joint driving motor 350 in place, while permitting free rotation of the drive shaft 352. In this configuration, when the joint driving motor 350 is actuated, it can drive the joint 316B to pivot.

FIG. 3B illustrates the leg 304, after pivoting from the leg position illustrated in FIG. 3A. The leg 304 illustrated in FIG. 3B has been pivoted counterclockwise, about joint 316B, positioning the foot 324 above the object 326. After the joint driving motor 350 has positioned the leg 304 as illustrated in FIG. 3B, the leg segment 304B can adopt its second configuration, securing the drive shaft 352 in place, while permitting movement of the joint driving motor 350 along the drive shaft 352 when the joint driving motor 350 is actuated. So configured, prior to engagement of the foot 324 with the object 326, the joint driving motor 350 can be moved from its starting position adjacent to the foot 324, as illustrated in FIG. 3A, to a desired position closer to the joint 316B as illustrated in FIG. 3B. In the new motor position illustrated in FIG. 3B, the load acting on the joint 316B can be reduced prior to engagement of the object 326 with the foot 324. Subsequently, the leg segment 304B can return to the first configuration in preparation for motion of the leg 304 to engage the object 326.

FIG. 3C illustrates the leg 304, after engagement with the object 326. After the foot 324 contacts the object 326, it is again possible for the leg segment 304B to enter the second configuration and move the joint driving motor 350 to in a position closer to the foot 324. By reducing the height of the joint driving motor 350 within the leg 304, the center of gravity of the robot 300 can be lowered, promoting stability of the robot 300.

It can be understood that, while a single leg 304 and joint driving motor 350 are discussed with respect to the motions illustrated in FIGS. 3A-3C, the disclosed embodiments can be applied to the motion of multiple legs. As discussed above, in some embodiments, each leg 304 can include a weight sensor 390 positioned in the foot 324 that conveys information representing a measured change in weight acting on the respective leg 304 to a processor. The specific position at which the joint driving motor 350 of each leg 304 is placed is where an overall weight balance of the robot 300 is appropriate. For example, each of the joint driving motors 350 present in the respective legs of the robot 300 can be moved into positions that result in the weight measured by each of the respective joint driving motors 350 in the legs 304 to be approximately equal.

Figure 7:
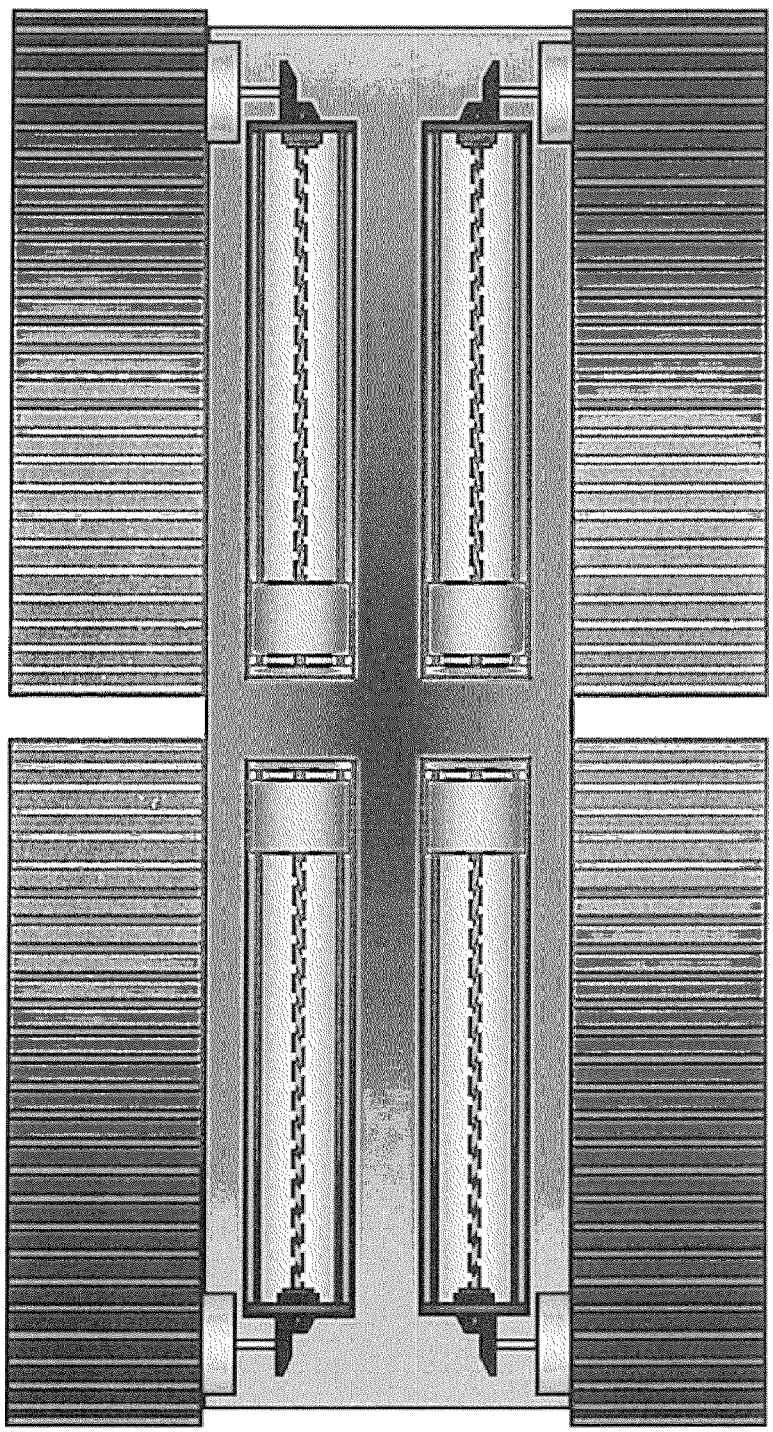
FIG. 7 is a schematic illustration of some embodiments of a crawler-type robot suitable for use with some embodiments of the present disclosure.

Weight distribution in this manner can also be provided in robots of types other than the multi-legged robot 300 discussed above. For example, FIG. 7 illustrates a crawler-type robot suitable for use with embodiments of the present disclosure. As noted above, in some embodiments, the robotic appendage allows for both reduction in torque or other forces required for leg movement, as well as improved or better stability. In some embodiments, the robotic appendage need not provide better stability, but does provide for a desired adjustment in torque or force requirements. In some embodiments, the robotic appendage does provide better stability, but need not provide for an adjustment in torque or force requirements.

In some embodiments, the appendages discussed herein (including, for example, arms, legs, etc.) can be employed to reduce loads on joints and actuating motors of robots or other machinery during motion and/or to promote stability. For example, robotic limbs are provided in which motors that actuate respective joints of the limb are positioned within the limb and configured to change position along at least a portion of the length of the limb.

In some embodiments, the motors can be positioned to provide stability of the robot 300 and/or to reduce loads on the joints of the robot 300. For example, when the limbs are not in motion, or not being readied for motion, the motors can be positioned at relatively low positions in the leg, with respect to a support surface. This positioning can enhance the stability of the robot 300, enabling the robot 300 to better stay in a designated location without falling over. In some embodiments, when the limbs are to be moved, the motors can be positioned relative close to a joint about which a pivoting motion is to take place. In this position, the load exerted on the joints is less. Additionally, the motors can be moved with respect to the weight exerted on other limbs so that the weight carried by each limb is approximately equal.

The term robot, as discussed herein, can include its ordinary meaning as understood in the art of robotics and can further include mechanical agents capable of performing tasks automatically or in response to guidance (e.g., instructions, remote control, etc.). For example, robots can include electro-mechanical machines guided by computer and electronic programming. Robots can include the ability to perform one or more of measuring data from a surrounding environment, process data, and respond to stimuli. Examples of robots can include, but are not limited to, mobile robots having an ability to move spatially within their physical environment and industrial robots including a jointed arm and a tool mounted at the end of the arm (e.g., a gripper).

EXAMPLE

Example 1

Use of a Moveable Motor to Increase Stability

The present example outlines how the moveable motor can be used to provide increased stability to a robot, when the robot is climbing.

A walking robot have six legs, each of which is embodied by the embodiments shown in FIG. 3A is provided. The robot is positioned in front of an object, which it is to climb over. The moveable motor in the lower section of the front leg of the robot, which is initially located proximally to the foot, is moved towards the knee joint of the robot. The foot is then repositioned on top of the object. The moveable motor is then repositioned proximally to the foot of the robot in the front leg. This process is then repeated for the other legs of the robot. This allows for the weight of the motors of each leg that has been placed on the object to be closer to the object onto which the robot is stepping, thereby improving the stability of the robot as it climbs onto the object.

Example 2

Use of Moveable Motor to Reduce Force on a Joint

The present example outlines how the moveable motor can be used to provide a reduction in force required to move a prosthetic arm.

A prosthetic arm is provided that includes the moveable motor arrangement as provided in FIG. 3A. The movable motor is located in the lower section of the prosthetic arm (closer to the hand). The joint about which the torque occurs is the elbow of the prosthetic arm. When added weight or leveraged force is desired at the end of the prosthetic arm, the motor is positioned at the lower end of the arm (proximal to the hand). When the user wishes to actuate the lower arm (e.g., bend the elbow), the motor can be repositioned to be close to the elbow, thereby allowing for a reduction in the amount of force required to actuate the elbow.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

The subject matter described herein may illustrates different components (e.g., mechanical components, electronic components) contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components.

Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like may include the number recited and may further refer to ranges which can be subsequently broken down into subranges as discussed above. Finally, as will be understood by one skilled in the art, a range may include each individual member. Thus, for example, a group having 1-3 cells may refer to groups having 1, 2, or 3 cells. Similarly, a group having 1-5 cells may refer to groups having 1, 2, 3, 4, or 5 cells, and so forth.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

What is claimed is:

1. A motor system comprising:
   a leg segment having a first end and a second end;
   a drive shaft extending between the first end and the second end of the leg segment; and
   a drive motor, wherein a rotor of the drive shaft is configured to engage a portion of the drive shaft;
   wherein the drive motor is configured such that rotation of the rotor when the drive motor is substantially fixed in place causes rotation of the drive shaft and wherein rotation of the rotor when the drive shaft is substantially fixed in place causes the drive motor to move along the length of the drive shaft.

2. The motor system of claim 1, wherein the drive shaft and motor are positioned outside of the leg segment.

3. The motor system of claim 1, wherein the leg segment comprises a tube.

4. The motor system of claim 3, wherein the drive shaft and motor are positioned inside of the tube.

5. The motor system of claim 4, further comprising:
   a helical groove positioned along at least a portion of the length of the drive shaft; and
   a helical guide positioned along at least a portion of the length of the rotor;
   wherein engagement of the rotor with the drive shaft comprises engagement of the helical guide of the rotor with the helical groove of the drive shaft.

6. The motor system of claim 3, further comprising at least one generally elongate guide member positioned adjacent to the drive shaft, wherein the drive motor is configured to move along the length of the drive shaft on the at least one guide member.

7. The motor system of claim 6, further comprising a motor fixing system configured to actuate between a disengaged position that permits movement of the drive motor and an engaged position that substantially fixes the drive motor in place.

8. The motor system of claim 7, wherein the motor fixing system comprises at least one pad positioned adjacent respective to the at least one guide member, wherein the at least one pad does not substantially contact the at least one guide member when the motor fixing system is in the disengaged position and wherein the at least one pad substantially contacts the at least one member when the motor fixing system is in the engaged position.

9. The motor system of claim 8, wherein at least one guide member comprises at least one indicator along its length, wherein the drive motor is configured to identify a position of the drive motor with respect to a length of the guide member by identifying the at least one indicator.

10. The motor system of claim 9, wherein the motor fixing system is configured to actuate the at least one pad to the engaged position upon detection of a selected indicator.

11. The motor system of claim 3, further comprising a shaft fixing system configured to actuate between a disengaged position that permits movement of the drive shaft and an engaged position that substantially fixes the drive shaft in place.

12. The motor system of claim 11, wherein the shaft fixing system comprises:
   a disk that is engaged with the drive shaft and rotates with the drive shaft; and
   a multiple number of disk pads;
   wherein the multiple number of disk pads do not substantially inhibit motion of the disk when the fixing system is in the disengaged position and wherein the multiple number of pads substantially inhibit motion of the disk when the fixing system is in the engaged position.

13. A robot limb, comprising:
   the motor system of claim 3; and
   a gear mounted to the tube adjacent to a first end of the tube;
   wherein the gear engages the first end of the drive shaft such that rotation of the drive shaft urges the gear to rotate and wherein the gear is configured to pivot the tube around an axis of rotation of the gear when the gear moves.

* * * * *